United States Patent
Graif et al.

(10) Patent No.: US 11,360,916 B2
(45) Date of Patent: Jun. 14, 2022

(54) GROUP SLAVE IDENTIFIER TIME-MULTIPLEXED ACKNOWLEDGMENT FOR SYSTEM POWER MANAGEMENT INTERFACE

(71) Applicant: QUALCOMM Incorporated, San Diego, CA (US)

(72) Inventors: Sharon Graif, Zichron Yaakov (IL); Navdeep Mer, Bangalore (IN); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/005,143

(22) Filed: Aug. 27, 2020

(65) Prior Publication Data
US 2022/0066955 A1     Mar. 3, 2022

(51) Int. Cl.
| | | |
|---|---|---|
| *G06F 13/16* | (2006.01) | |
| *G06F 1/28* | (2006.01) | |
| *G06F 13/42* | (2006.01) | |
| *G06F 13/40* | (2006.01) | |
| *G06F 11/07* | (2006.01) | |

(52) U.S. Cl.
CPC ............ *G06F 13/1668* (2013.01); *G06F 1/28* (2013.01); *G06F 11/0745* (2013.01); *G06F 11/0751* (2013.01); *G06F 11/0793* (2013.01); *G06F 13/4027* (2013.01); *G06F 13/4282* (2013.01)

(58) Field of Classification Search
CPC ...... G06F 13/1668; G06F 1/28; G06F 11/075; G06F 11/0751; G06F 11/0793; G06F 13/4027; G06F 13/4282
See application file for complete search history.

(56) References Cited

U.S. PATENT DOCUMENTS

| | | | |
|---|---|---|---|
| 2017/0199832 A1* | 7/2017 | Mishra | G06F 13/364 |
| 2019/0050366 A1* | 2/2019 | Mishra | G06F 9/30101 |
| 2020/0153470 A1* | 5/2020 | Ngo | H04B 1/3805 |

* cited by examiner

*Primary Examiner* — Glenn A. Auve
(74) *Attorney, Agent, or Firm* — Qualcomm Incorporated

(57) ABSTRACT

Systems, methods, and apparatus are configured to enable a receiver to provide feedback. A feedback mechanism enables a transmitting device to identify the provider of feedback for a multicast transmission, and the feedback transmitted by one or more individual receivers of the multicast transmission. A method includes receiving a multicast write command from the serial bus in a first datagram, writing a data byte received in a first data frame of the first datagram to a register address identified by the first datagram, and providing device-specific feedback regarding the first datagram in a multibit slot within the second data frame. The multibit slot is one of a plurality of sequential multibit slots defined for the second data frame. Each multibit slot in the plurality of sequential multibit slots may provide device-specific feedback from one receiving device addressed by the multicast write command.

30 Claims, 14 Drawing Sheets

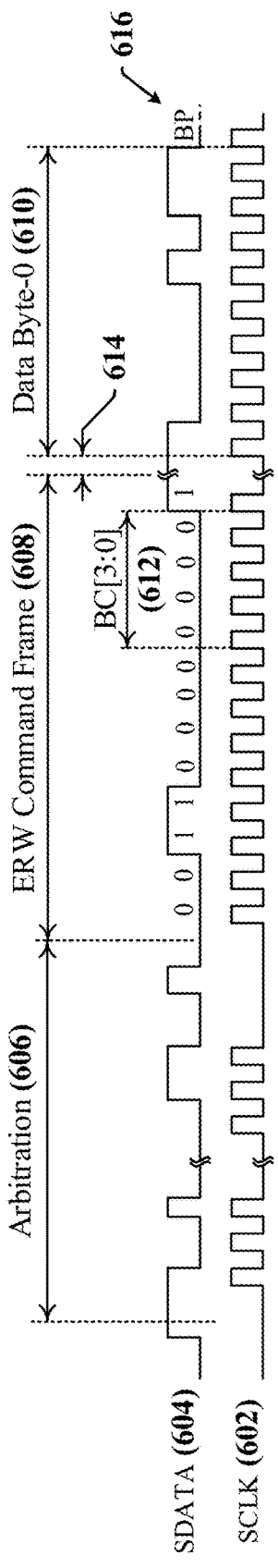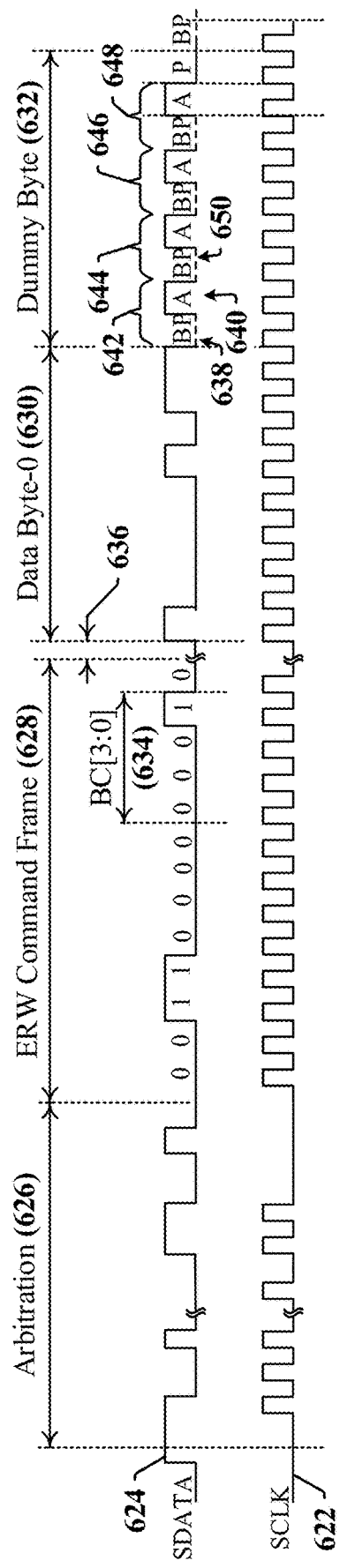
FIG. 6

GROUP SLAVE IDENTIFIER TIME-MULTIPLEXED ACKNOWLEDGMENT FOR SYSTEM POWER MANAGEMENT INTERFACE

TECHNICAL FIELD

The present disclosure relates generally to serial communication over a shared serial bus and, more particularly, to providing feedback on a shared bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I$^2$C) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. SPMI protocols define a hardware interface that may be implemented between baseband or application processors and peripheral components. In some instances, SPMI protocols are implemented to support power management operations within a device.

There is a continually increasing demand for multi-drop serial buses that are capable of supporting more complex applications and new protocols by enabling large numbers of devices to communicate reliably with increased speed and throughput, while maintaining compatibility with legacy devices.

SUMMARY

Certain aspects of the disclosure relate to systems, apparatus, methods and techniques that can enable devices coupled to a serial bus to provide feedback that includes acknowledgement of transmissions over the serial bus. According to certain aspects, existing bus protocols can be leveraged to implement a feedback mechanism while providing for coexistence with conventional slave devices. The feedback mechanism enables a transmitting device to identify the provider of feedback for a multicast transmission, and feedback may be transmitted by one or more individual receivers of the multicast transmission. The bus may be operated in accordance with an SPMI protocol, or another protocol usable on a serial bus.

In various aspects of the disclosure, a method performed at a device coupled to a serial bus includes receiving a multicast write command from the serial bus, wherein the multicast write command is received in a first datagram and configured in accordance with an SPMI protocol, writing a data byte received in a first data frame of the first datagram to a register address identified by the first datagram, and providing device-specific feedback regarding the first datagram in a multibit slot within the second data frame. The multibit slot may be one of a plurality of sequential multibit slots defined for the second data frame. Each multibit slot in the plurality of sequential multibit slots may provide device-specific feedback from one receiving device addressed by the multicast write command.

In various aspects of the disclosure, an apparatus includes an interface circuit adapted to couple the apparatus to a serial bus, and a processor. The processor may be configured to receive a multicast write command from the serial bus, wherein the multicast write command is received in a first datagram and configured in accordance with an SPMI protocol, write a data byte received in a first data frame of the first datagram to a register address identified by the first datagram, and provide device-specific feedback regarding the first datagram in a multibit slot within the second data frame. The multibit slot may be one of a plurality of sequential multibit slots defined for the second data frame. Each multibit slot in the plurality of sequential multibit time slots.

In various aspects of the disclosure, a processor-readable storage medium stores code for receiving a multicast write command from the serial bus, where the multicast write command is received in a first datagram and configured in accordance with an SPMI protocol, writing a data byte received in a first data frame of the first datagram to a register address identified by the first datagram, and providing device-specific feedback regarding the first datagram in a multibit slot within the second data frame. The multibit slot may be one of a plurality of sequential multibit slots defined for the second data frame. Each multibit slot in the plurality of sequential multibit slots may provide device-specific feedback from one receiving device addressed by the multicast write command.

In various aspects of the disclosure, an apparatus includes means for receiving a multicast write command from the serial bus, where the multicast write command is received in a first datagram and configured in accordance with an SPMI protocol, means for writing a data byte received in a first data frame of the first datagram to a register address identified by the first datagram, and means for providing device-specific feedback regarding the first datagram in a multibit slot within the second data frame. The multibit slot may be one of a plurality of sequential multibit slots defined for the second data frame. Each multibit slot in the plurality of sequential multibit slots may provide device-specific feedback from one receiving device addressed by the multicast write command.

In various aspects of the disclosure, a method performed at a transmitting device coupled to a serial bus includes transmitting a multicast write command over the serial bus in a first datagram that is configured in accordance with an SPMI protocol, transmitting a data byte in a first data frame of the datagram, providing a bus park sequence on the serial bus after transmitting the first data frame, and receiving feedback regarding the first datagram during the second data frame. Each of a plurality of sequential multibit slots within the second data frame may include device-specific feedback provided by one receiving device addressed by the multicast write command.

In various aspects of the disclosure, an apparatus includes an interface circuit adapted to couple the apparatus to a serial bus, and a processor. The processor may be configured to transmit a multicast write command over the serial bus in a first datagram that is configured in accordance with an SPMI protocol, transmit a data byte in a first data frame of the datagram, provide a bus park sequence on the serial bus after transmitting the first data frame, and receive feedback regarding the first datagram during the second data frame. Each of a plurality of sequential multibit slots within the second data frame includes device-specific feedback provided by one receiving device addressed by the multicast write command.

In various aspects of the disclosure, a processor-readable storage medium stores code for transmitting a multicast write command over the serial bus in a first datagram that is configured in accordance with an SPMI protocol transmitting a data byte in a first data frame of the datagram, providing a bus park sequence on the serial bus after transmitting the first data frame, and receiving feedback regarding the first datagram during the second data frame. Each of a plurality of sequential multibit slots within the second data frame may include device-specific feedback provided by one receiving device addressed by the multicast write command.

In various aspects of the disclosure, an apparatus includes means for transmitting a multicast write command over the serial bus in a first datagram that is configured in accordance with an SPMI protocol, means for transmitting a data byte in a first data frame of the datagram, means for providing a bus park sequence on the serial bus after transmitting the first data frame, and means for receiving feedback regarding the first datagram during the second data frame. Each of a plurality of sequential multibit slots within the second data frame may include device-specific feedback provided by one receiving device addressed by the multicast write command.

BRIEF DESCRIPTION OF THE DRAWINGS

FIG. 6 illustrates a first transaction that supports device-specific feedback using an SPMI Extended Register Write command configured in accordance with certain aspects disclosed herein.

DETAILED DESCRIPTION

Figure 1:
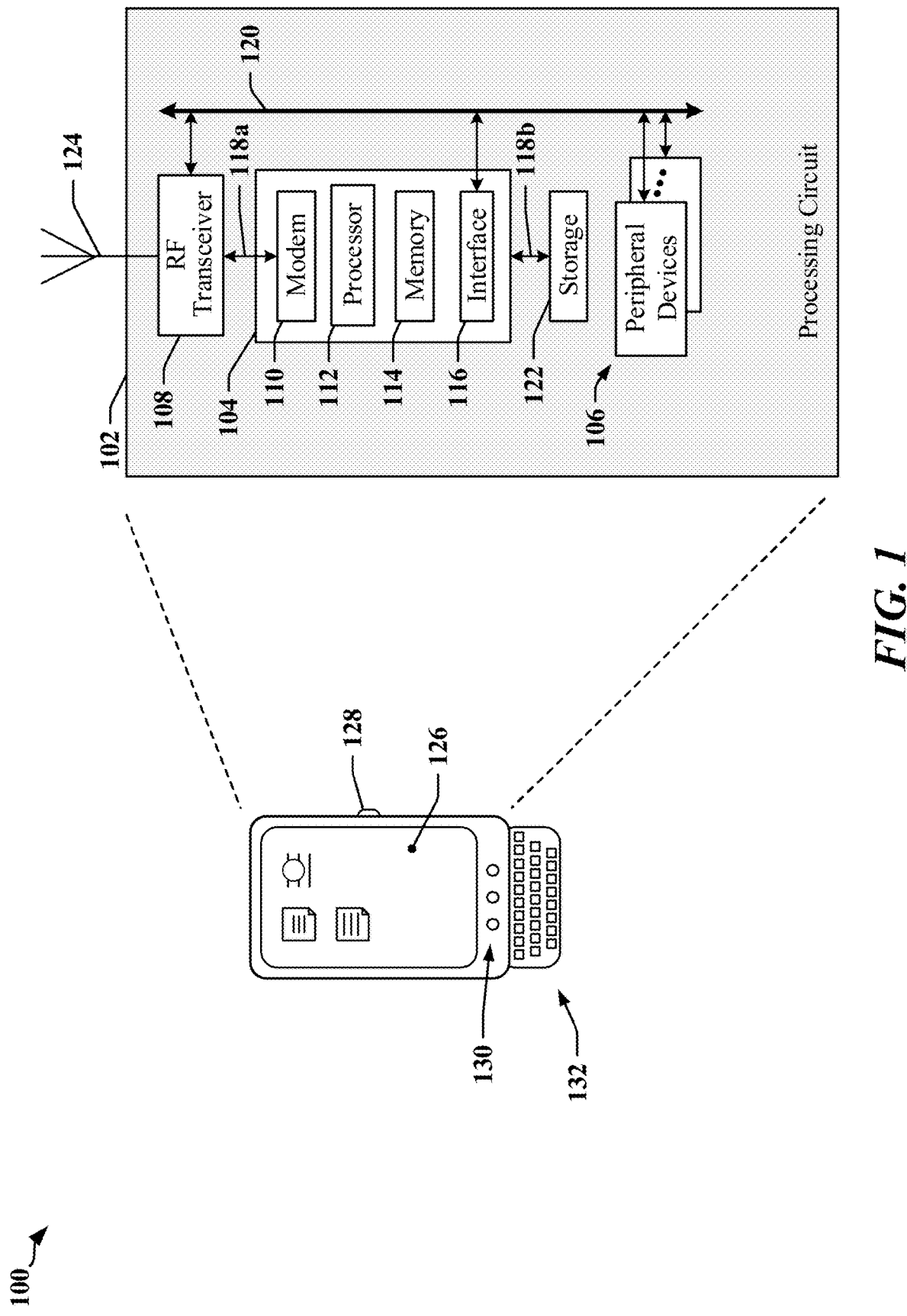
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include SoC and other IC devices often employ a shared communication interface that may include a serial bus or other data communication link to connect different devices. In one example, a multi-drop serial bus may be implemented to interconnect processors with modems and other peripherals. The serial bus or other data communication link may be operated in accordance with multiple standards or protocols defined. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the use of greater numbers of peripherals, radio-frequency front-end devices and/or sensors device in support of complex applications requires updates to existing bus protocols that include new features that were undefined in earlier versions of the bus protocols.

Certain aspects of the disclosure relate to the signaling of device-specific feedback in response to a multicast write command that is transmitted to multiple devices coupled to a serial bus using datagrams that are compatible with a protocol used to manage operations of the serial bus. A device addressed by the multicast write command may signal feedback in a time slot assigned for the use of the device within a dummy write byte included in the datagram that carries the multicast write command. In one example, a first device may signal feedback in a time slot in the dummy byte that is reserved for the sole use of the first device. Other devices coupled to the serial bus may be prohibited from using the time slot reserved or assigned for the use of the first device. In some implementations, the protocol used to manage operations of the serial bus is defined by SPMI specifications.

According to certain aspects, existing bus protocols can be leveraged to implement the presently disclosed feedback mechanism, while providing for coexistence with conventional slave devices. The feedback mechanism enables a transmitting device to identify the provider of feedback for a multicast transmission, and the feedback transmitted by one or more individual receivers of the multicast transmission. In various aspects of the disclosure, a method performed at a device coupled to a serial bus includes receiving a multicast write command from the serial bus, wherein the multicast write command is received in a first datagram and configured in accordance with an SPMI protocol, writing a data byte received in a first data frame of the first datagram to a register address identified by the first datagram, and providing device-specific feedback regarding the first datagram in a multibit slot within the second data frame. The multibit slot is one of a plurality of sequential multibit slots defined for the second data frame. Each multibit slot in the plurality of sequential multibit slots may provide device-specific feedback from one receiving device addressed by the multicast write command.

Certain aspects disclosed herein are described with reference to a serial bus operated in accordance with SPMI protocols. However, certain concepts may be equally applicable to RFFE protocols, I3C protocols, I2C protocols, and/or or another bus protocol. Certain aspects are applicable to a serial bus operated in half-duplex mode or full-duplex mode. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
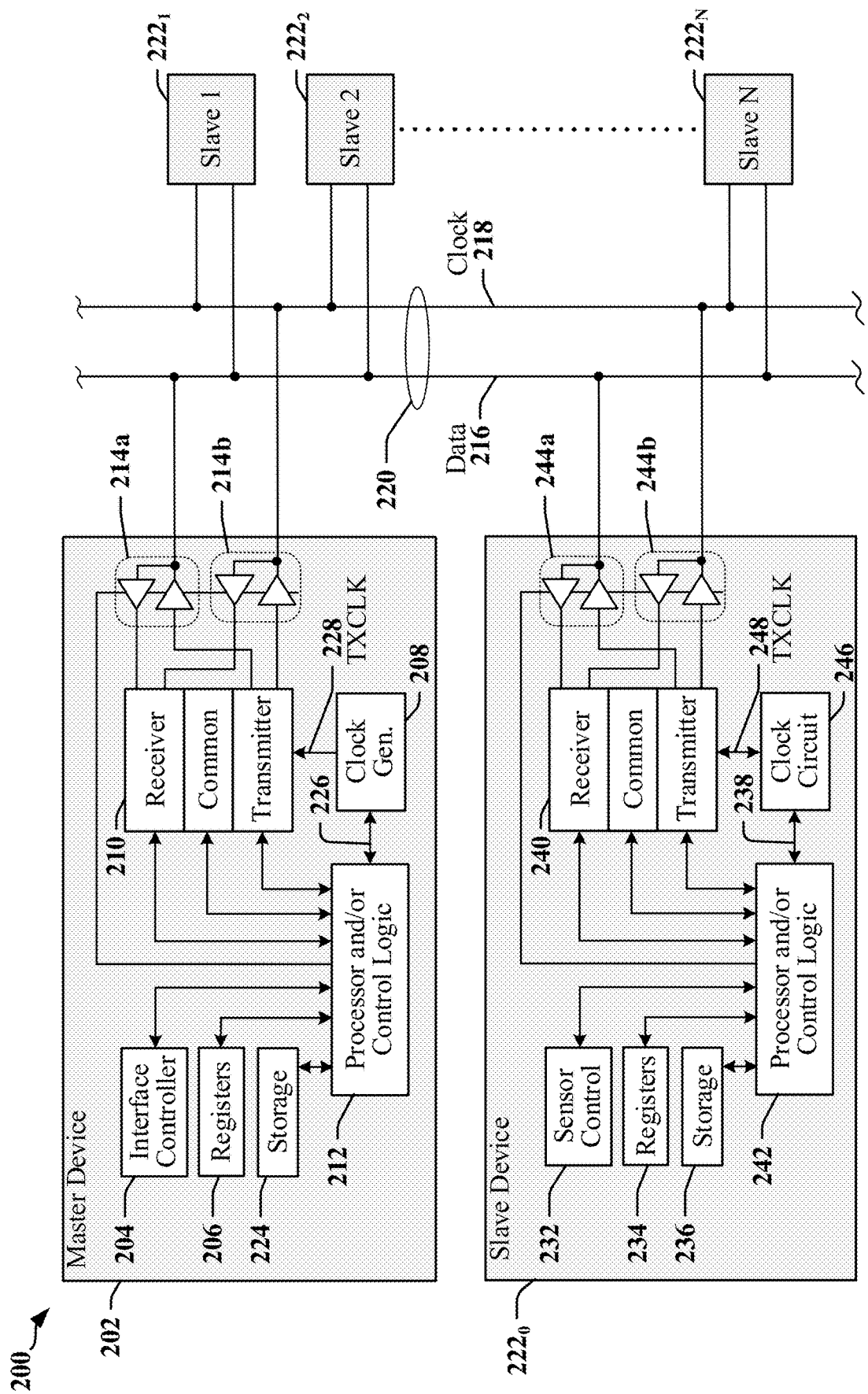
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 24a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with an I2C protocol, I3C protocol, RFFE protocol, SPMI protocol, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

In some conventional systems, multiple serial buses are provided to support demands for high data throughput, low latency, high bus availability and/or for other reasons. In some instances, multiple serial buses are used to alleviate issues cause by limited addressing capabilities of serial bus protocols. By way of example, FIGS. 3 and 4 illustrate systems in which multiple serial buses may be employed to interconnect master and slave devices.

Figure 3:
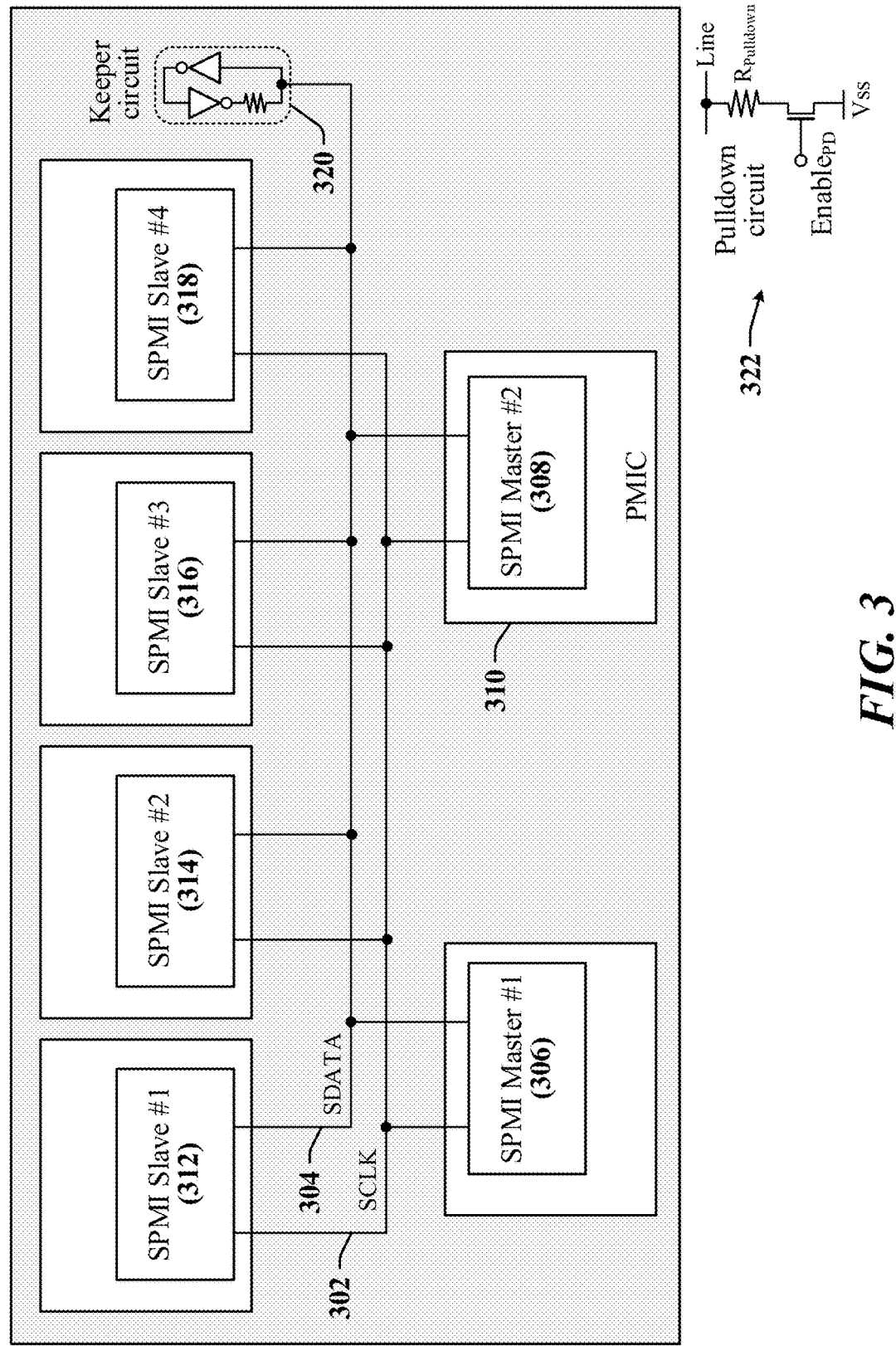
FIG. 3 illustrates a device that employs an SPMI bus to couple various devices in accordance with certain aspects disclosed herein.
Figure 4:
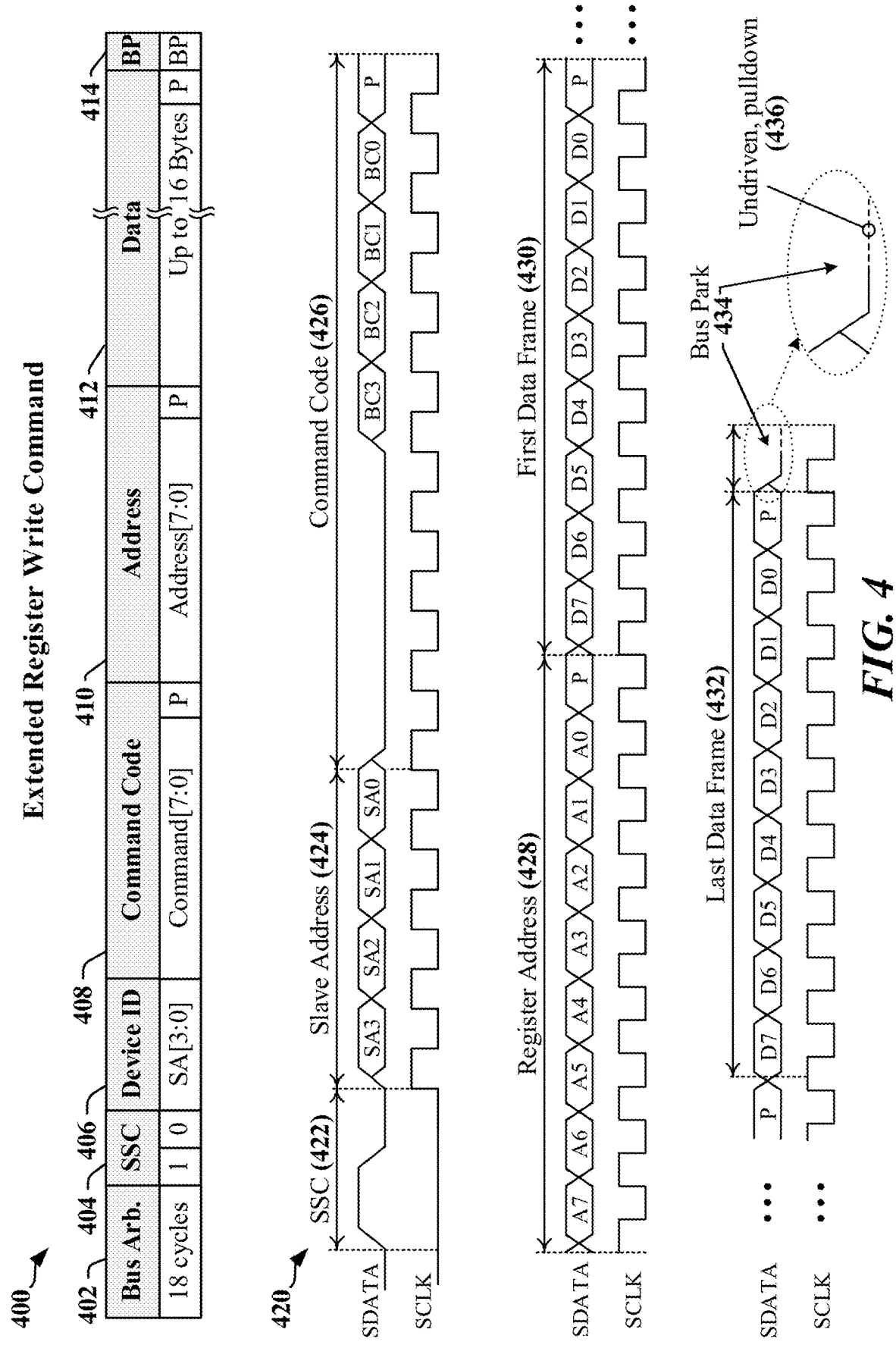
FIG. 4 illustrates a datagram structure and timing diagram for an SPMI Extended Register Write command.

FIG. 3 illustrates an example of a system 300 that may include a serial bus operated in accordance with an SPMI, and/or another bus protocol. In some implementations, SPMI protocols are used for power management control, where the bus may be configured to support communication of commands used to cause circuits and/or functional components to reset, sleep, shutdown, wakeup, and so on. In some implementations, SPMI bus protocols may be used to implement a general-purpose communication link. In the illustrated example, a two-wire serial bus includes a first wire (SCLK 302) that carries a clock signal and a second wire (SDATA 304) that carries a data signal transmitted in accordance with timing provided in the clock signal. The serial bus may connect multiple slave devices, including application processors, modems, sensors, controllers etc. that can be configured to serve as a master device. For example, a power management integrated circuit (PMIC 310) may be coupled to a serial bus that is operated in accordance with an SPMI protocol.

Devices may be coupled to the serial bus as a slave device or as a master device. In the example of a serial bus operated in accordance with an SPMI protocol, between one and four master devices 306, 308 and up to 16 slave devices 312, 314, 316, 318 may be coupled to the serial bus. SPMI protocols, support bus contention arbitration, request arbitration and group addressing. Slave devices 312, 314, 316, 318 coupled to the serial bus devices may be required to acknowledge certain commands. A Bus Arbitration sequence is performed before transactions to allocate control of the serial bus to one master or to one slave when multiple devices are requesting access to the serial bus in order to send a command sequence. A request for access to the serial bus can be made when the bus is idle by driving SDATA 304 to a high signaling state while SCLK 302 is in a low signaling state. Certain slave devices are capable of requesting access to the serial bus.

During certain operations, SCLK 302 and/or SDATA 304 may be undriven and may be held in a signaling state by keeper circuit 320, or by a pulldown circuit 322. In one example, a keeper circuit 320 may be configured as a positive feedback circuit that drives SDATA 304 through a high impedance output, and receives feedback from SDATA 304 through a low impedance input. The keeper circuit 320 may be configured to maintain the last asserted voltage on SDATA 304. The keeper circuit 320 can be easily overcome by a line driver in a master device 306, 308 or a slave device 312, 314, 316, 318. In some instances, a pulldown circuit 322 (or pull-up circuit) may be used to maintain SCLK 302 and/or SDATA 304 in a desired signaling state. The illustrated pulldown circuit 322 can be activated to couple a pulldown resistor to a line of the serial bus.

Protocols that support communication over a multi-drop serial bus may define a datagram structure used to transmit command, control and data payloads within application-defined latency tolerances. Datagram structures for different protocols define certain common features, including addressing used to select devices to receive or transmit data, clock generation and management, interrupt processing and device priorities. In this disclosure, the example of SPMI protocols is generally employed to illustrate certain aspects of the disclosure. However, the concepts disclosed herein are applicable to other serial bus protocols and standards.

FIG. 4 illustrates a datagram 400 and a corresponding timing diagram 420 for an Extended Register Write (ERW) command that may be transmitted over a serial bus. The datagram 400 may be transmitted by a device that wins bus arbitration during an arbitration sequence 402. The datagram 400 commences with a two-bit sequence start condition (SSC 404, 422) followed by a four-bit slave address 406, 424 or other device identifier. An 8-bit command code 408, 426 is provided with a parity bit. The command code 408 426 includes a byte count (BC[3:0]) that indicates the number of bytes to be written. The command code 408, 426 is followed by an 8-bit register address 410, 428 and between one and sixteen frames of data 412. The data may include at least a first data frame 430. After transmission of a final data frame 432, bus park signaling 414, 434 is provided. The bus park signaling 414, 434 is provided when the slave device initially drives SDATA low and then releases SDATA to an undriven state 436, in which SDATA is held low by a keeper circuit, a pulldown circuit/resistance.

Figure 5:
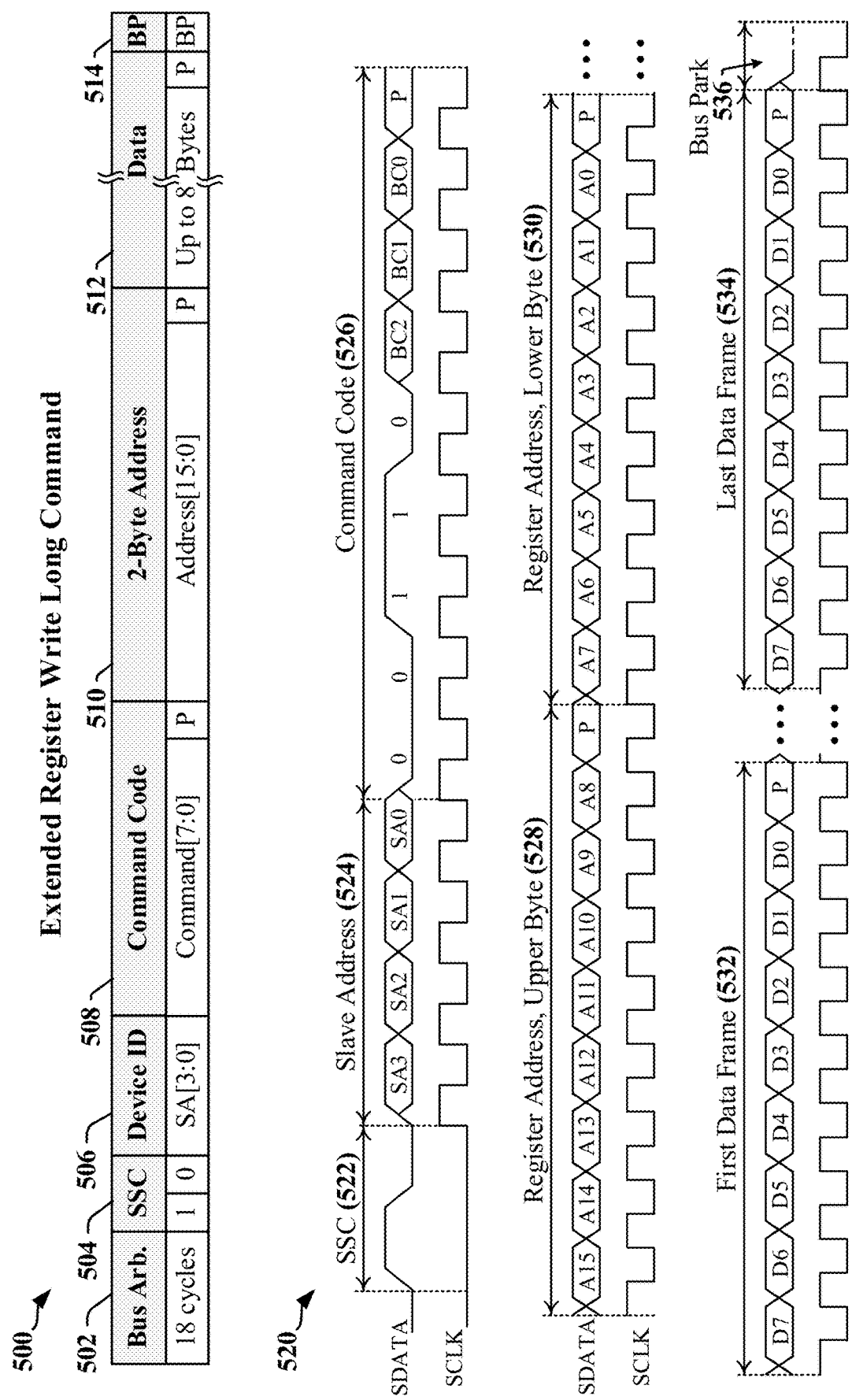
FIG. 5 illustrates a datagram structure and timing diagram for an SPMI Extended Register Write Long command.

FIG. 5 illustrates a datagram 500 and a corresponding timing diagram 520 for an Extended Register Write Long (ERWL) command that may be transmitted over a serial bus. The datagram 500 may be transmitted by a device that wins bus arbitration during an arbitration sequence 502. The datagram 500 commences with transmission of a two-bit sequence start condition (SSC 504, 522) followed by a four-bit slave address 506, 524 or other device identifier. An 8-bit command code 508, 526 is provided with a parity bit. The command code 508, 526 includes a byte count (BC[2:0]) that indicates the number of bytes to be written. The command code 508, 526 is followed by a 16-bit register address 510. The 16-bit register address 510 may include an upper address byte 528 and a lower address byte 530. Between one and eight frames of data 512 may be transmitted in the datagram 500. The data 512 may include at least a first data frame 532. After transmission of a final data frame 534, bus park signaling 514, 536 is transmitted.

Certain versions of SPMI specifications (which may be identified as SPMI 1.x herein) do not include all of the features defined for later versions of the SPMI specifications (which may be identified as SPMI 2.x herein). In one example, an acknowledgement feature defined for SPMI 2.x is not available for use on a device operating in accordance with SPMI 1.x. In some SPMI 2.x implementations, an acknowledge/not acknowledge (ACK/NACK) bit may be transmitted at the end of a datagram, after first bus park signaling 414, 434, 514, 536 and may be followed by second bus park signaling. When a Command Sequence that provides for an ACK/NACK bit is addressed to a single device using a unique slave identifier (USID) or a master identifier (MID), the addressed device may be configured to respond with an ACK/NACK bit value of 'b1 if the command sequence was received correctly. The addressed device may be configured to respond with an ACK/NACK bit value of '0 if the command sequence was received correctly.

Conventional SPMI protocols do not provide a feedback mechanism for multicast write transactions that permits multiple receiving devices to indicate to the SPMI initiator device whether data or commands transmitted in the multicast transactions have been successfully received. Multicast transactions include a command sequence addressed to a group of slave devices using a group slave identifier (GSID). Some conventional multicast transactions provide an ACK/NACK bit that can be driven by any of the devices addressed by the GSID. When a NACK bit is returned in these conventional systems, the initiator of the multicast transaction cannot determine which of the receiving devices transmitted the NACK bit, and must assume that the transaction failed for all SPMI devices that are configured to respond to the GSID. For example, a first addressed device may receive the transmitted data without error and may be configured to maintain its line driver for SDATA in a high-impedance state to respond with ACK, while a second device may drive the ACK/NACK bit with a 'b1 value to indicate NACK when an error is detected in the command sequence or data. The transmission of NACK by the second device overrides the ACK response of the first device. NACK is provided when any device drives the ACK/NACK bit with a 'b1 value, and ACK is provided when all devices refrain from driving SDATA. SDATA is typically pulled low when all devices are in a high-impedance state on an SPMI bus.

Certain aspects of this disclosure relate to techniques that leverage existing bus protocols to expand the ability of devices coupled to a serial bus to provide individualized feedback in multicast transactions that include a write command. Individualized feedback in a multicast transaction can include feedback that includes device identification. In one aspect of this disclosure, a dummy data byte provided in the multicast transaction can carry multiple bits of feedback. In another aspect, individual time slots and/or bit positions in the dummy data byte can be reserved for the use of individual devices to provide feedback. In another aspect, the byte count in the command sequence of the multicast transaction may be manipulated to ensure that a sufficient number of clock pulses are provided to accommodate transmission of the dummy data byte.

Each receiving device can provide feedback by driving an ACK/NACK bit in a time slot reserved for the use of the receiving device. In one example, an ACK may be provided in a first bit position to indicate error-free receipt of a command sequence and/or one or more data bytes by a first receiving device, and a NACK may be provided in a second bit position to indicate an error in the command sequence and/or in one or more data bytes received by a second receiving device.

The feedback mechanism provided in accordance with certain aspects of this disclosure can be used when devices compliant with SPMI 2.x are configured for use on a serial bus operated in accordance the SPMI 1.x. In one aspect, the feedback mechanism does not impact the functionality of legacy devices, while a device that is compliant with SPMI 2.x and configured according to certain aspects of this disclosure may support the feedback mechanism that uses dummy data bytes according to certain aspects of this disclosure when an ACK/NACK cycle is not available for ERW and ERWL command sequences (e.g., when SPMI 1.x protocols are in use).

In accordance with certain aspects of this disclosure, dummy bytes may be provided in multicast transactions, which include an ERW or ERWL transaction directed to a GSID. The dummy bytes may be used to support time-division multiplexing (TDM) feedback enabling receiving devices that are addressed by a multicast write transaction to indicate ACK/NACK.

FIG. 6 illustrates a first example of TDM feedback provided in accordance with certain aspects disclosed herein. A first timing diagram illustrates certain portions of a datagram 600 that includes a conventional ERW command frame 608 transmitted using SCLK 602 and SDATA 604, and a second timing diagram illustrates certain portions of a datagram 620 that includes an ERW command 628 that has been configured for TDM feedback in accordance with certain aspects disclosed herein. TDM feedback may be configured when a master device writes to one or more configuration registers in a receiving device. The receiving device may be configured to respond to a datagram 600 that includes a conventional ERW command frame 608 when first configuration values are written by the master device. The receiving device may be configured to provide TDM feedback in response to a datagram 620 that includes an ERW command 628 that has been configured for TDM feedback when second configuration values are written by the master device. According to certain aspects of the disclosure, TDM feedback is provided in a datagram using a dummy data byte provided after the last valid data byte. A conventional device may be configured by protocol to ignore the dummy data byte.

Bus arbitration 606, 626 precedes transmission of an ERW command frame 608, 628. The device that wins bus arbitration 606, 626 transmits the ERW command frame 608, 628, which includes a target slave identifier, and the ERW command code. In these examples, a GSID is transmitted as the target slave identifier. In the first datagram 600, the ERW command code includes a byte count 612 (BC[3:0]) that is set to '0' indicating that one byte is to be written. The ERW command frame 608 is followed by an 8-bit register address (shown as a compressed period 614) followed by a single data byte 610. Bus park signaling 616 indicates the end of the datagram.

In the second datagram 620, the ERW command code includes a byte count 634 (BC[3:0]) that is set to '1' indicating to the receiver that two data bytes are being transmitted, causing the transmitter to provide sufficient clock pulses for the transmission of the two data bytes. The configuration of the dummy data byte 632 causes a conventional receiving device to ignore the last data byte transmitted in the second datagram 620. A device that is configured to provide feedback, may be further configured in accordance with certain aspects of this disclosure to provide the feedback in an assigned timeslot defined within the data frame corresponding to the dummy data byte 632.

Continuing with the second datagram 620, an 8-bit register address (shown as a compressed section 636) is transmitted after the ERW command frame 628, followed by a data byte 630 for writing to the identified register address. The transmitter provides bus park signaling 638 by initially driving SDATA 624 to the low signaling state during the first clock pulse transmitted on SCLK 622 for the dummy data byte 632, and after the last bit (the parity bit) of the data byte 630 has been transmitted. The transmitter releases SDATA 624 and causes its SDATA line driver to enter a high-impedance state. SDATA 624 can remain in an undriven state, being held low by a keeper circuit or a pull-down circuit. In a first feedback slot 642, a first receiving device can provide feedback in the form of an ACK/NACK bit 640. After driving SDATA 624, the first receiving device may provide bus park signaling 650 by initially driving SDATA 624 to the low signaling state during the next clock pulse transmitted on SCLK 622, before releasing SDATA 624 and causing its SDATA line driver to enter a high-impedance state. A second receiving device can provide feedback in a second feedback slot 644, and so on.

Each feedback slot 642, 644, 646, 648 that is actively driven includes a sequence of bus park signaling followed by ACK/NACK, and this sequence is repeated until transmission of the dummy data byte 632 has been completed. In the illustrated example, four sequential feedback slots 642, 644, 646, 648 are provided. Each feedback slot 642, 644, 646, 648 can be assigned for the use of a single receiving device. In some instances, fewer than four feedback slots 642, 644, 646, 648 can be assigned to a single receiving device and the remaining feedback slots 642, 644, 646, 648 can be used for a joint response by two or more receiving devices.

A receiving device may activate its SDATA driver and drive SDATA 624 to the high signaling state after the bus park signaling 638 provided in its assigned feedback slot 642, 644, 646, 648 in order to acknowledge successful receipt of the datagram. A receiving device may provide a NACK by maintaining its SDATA driver in an inactive mode such that SDATA 624 is held in the low signaling state by the keeper circuit or the pull-down circuit.

Figure 7:
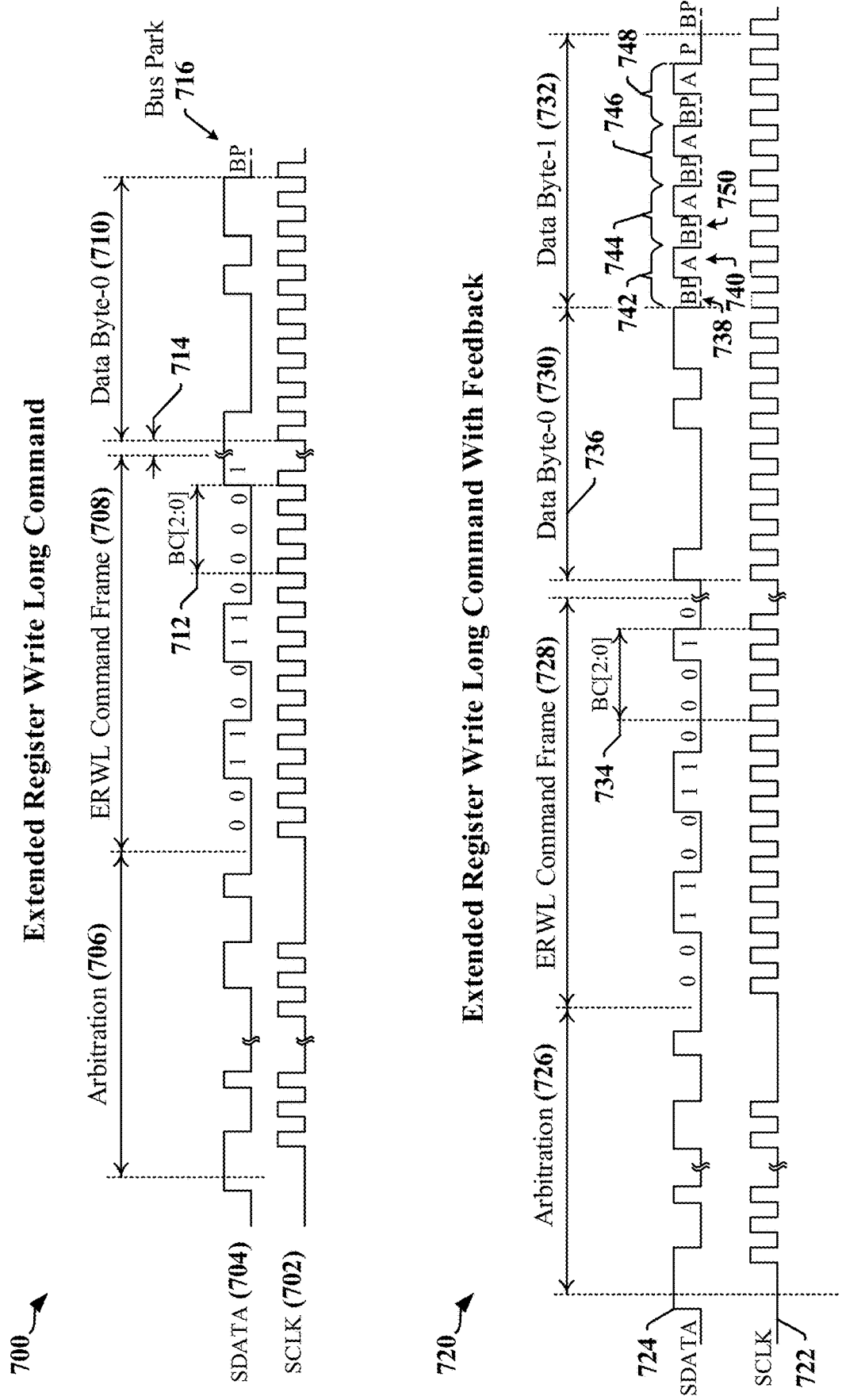
FIG. 7 illustrates a second transaction that supports device-specific feedback using an SPMI Extended Register Write Long command configured in accordance with certain aspects disclosed herein.

FIG. 7 illustrates a second example of TDM feedback provided in accordance with certain aspects disclosed herein. In this example, device-specific feedback is supported using an ERWL command. A first timing diagram 700 illustrates certain portions of a datagram that includes a conventional ERWL command frame 708 transmitted using SCLK 702 and SDATA 704, and a second timing diagram illustrates certain portions of a datagram 720 that includes an ERWL command 728 that has been configured for TDM feedback in accordance with certain aspects disclosed herein. TDM feedback may be configured when a master device writes to one or more configuration registers in a receiving device. The receiving device may be configured to respond to a datagram that includes a conventional ERWL command frame 708 when first configuration values are written by the master device and respond to a datagram 720 that includes an ERWL command 728 that has been configured for TDM feedback when second configuration values are written by the master device. According to certain aspects of the disclosure, TDM feedback is provided in a datagram using a dummy data byte provided after the last valid data byte. A conventional device may be configured to ignore the dummy data byte.

Bus arbitration 706, 726 precedes transmission of an ERWL command frame 708, 728.

The device that wins bus arbitration 706, 726 transmits the ERWL command frame 708, 728, which includes a target slave identifier, and the ERWL command code. In the first timing diagram 700, the ERWL command code includes a byte count 712 (BC[2:0]) that is set to '0' indicating that one byte is to be written. The ERWL command frame 708 is followed by an 8-bit register address (shown as a compressed period 714) followed by a single data byte 710. Bus park signaling 716 indicates the end of the datagram.

In the second datagram 720, the ERWL command code includes a byte count 734 (BC[2:0]) that is set to '1' indicating to the transmitter that two data bytes are being transmitted, causing the transmitter to provide sufficient clock pulses for transmitting two bytes. The configuration of the dummy data byte 732 causes a conventional receiving device to ignore the last data byte transmitted in the second datagram 720. A device that is configured to provide feedback, may be further configured in accordance with certain aspects of this disclosure to provide the feedback within the data frame corresponding to the dummy data byte 732.

Continuing with the second datagram 720, after the ERWL command frame 728 an 8-bit register address (shown as a compressed period 736) is transmitted, followed by a data byte 730 for writing to the identified register address. The transmitter provides bus park signaling 738 by initially driving SDATA 724 to the low signaling state during the first clock pulse transmitted on SCLK 722 for the dummy data byte 732, and after the last bit (the parity bit) of the data byte 730 has been transmitted. The transmitter releases SDATA 724 and causes its SDATA line driver to enter a high-impedance state. SDATA 724 can remain in an undriven state, being held low by a keeper circuit or a pull-down circuit. In a first feedback slot 742, a first receiving device can provide feedback in the form of an ACK/NACK bit 740. After driving SDATA 724, the first receiving device may provide bus park signaling 750 by initially driving SDATA 724 to the low signaling state during the next clock pulse transmitted on SCLK 722, before releasing SDATA 724 and causing its SDATA line driver to enter a high-impedance state. A second receiving device can provide feedback in a second feedback slot 744, and so on.

Each feedback slot 742, 744, 746, 748 that is actively driven includes a sequence of bus park signaling followed by ACK/NACK, and this sequence is repeated until transmission of the dummy data byte 732 has been completed. In the illustrated example, four sequential feedback slots 742, 744, 746, 748 are provided. Each feedback slot 742, 744, 746, 748 can be assigned for the use of a single receiving device. In some instances, fewer than four feedback slots 742, 744, 746, 748 can be assigned to a single receiving device and the remaining feedback slots 742, 744, 746, 748 can be used for a joint response by two or more receiving devices.

A receiving device may activate its SDATA driver and drive SDATA 724 to the high signaling state after the bus park signaling 738 provided in its assigned feedback slot 742, 744, 746, 748 in order to acknowledge successful receipt of the datagram. A receiving device may provide a NACK by maintaining its SDATA driver in an inactive mode such that SDATA 724 is held in the low signaling state by the keeper circuit or the pull-down circuit.

Figure 8:
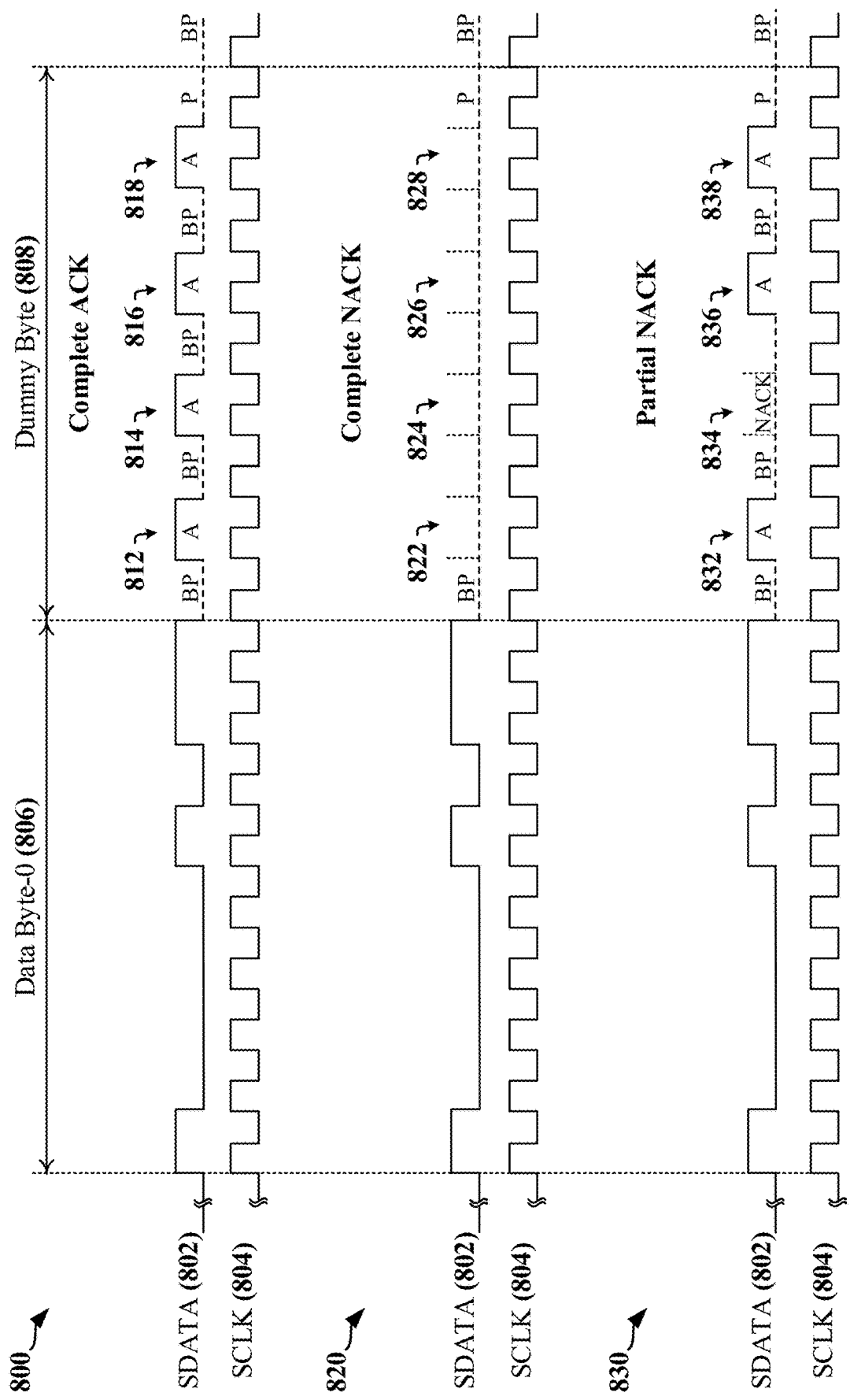
FIG. 8 illustrates examples of types of responses that may be anticipated when TDM feedback is provided in accordance with certain aspects of this disclosure.

FIG. 8 illustrates examples of types of responses that may be anticipated when TDM feedback is provided in accordance with certain aspects of this disclosure. The TDM feedback may provided in a datagram using a timed sequence of slots provided in a dummy byte 808 provided after the last valid data byte 806 has been transmitted. The timing of the sequence of slots is controlled by a clock signal transmitted on SCLK 804 and a device assigned to the current slot may drive SDATA 802 to a first signaling state when providing an ACK and may leave SDATA 802 undriven such that it remains in a second signaling state.

The first type of response may be referred to as a Complete ACK response 800, which may be expected when all devices associated with a GSID determine that a multicast write transaction has been completed without error. Up to four receiving devices may be assigned feedback slots in the dummy byte 808 and may drive SDATA 802 during respective assigned time slots when acknowledging a transmission. In the Complete ACK response 800, all receiving devices provide an ACK 812, 814, 816, 818 by activating their SDA line drivers during an assigned feedback slot, drive SDATA 802 to the first signaling state associated with positive acknowledgement, drive SDATA 802 to the second signaling state before releasing SDATA 802 to provide a bus park. A receiving device may release SDATA 802 by causing its line driver to enter a high impedance state. In the illustrated example, an ACK 812, 814, 816, 818 is indicated when SDATA 802 is driven to a high signaling state, and SDATA 802 is in a low signaling state after bus park and when a NACK is being provided.

The second type of response may be referred to as a Complete NACK response 820, which may be expected when all devices associated with a GSID detect at least one error in a multicast write transaction. Up to four receiving devices may be assigned feedback slots in the dummy byte 808 in which they can drive SDATA 802 during respective assigned time slots when acknowledging a transmission. In the Complete NACK response 820, all receiving devices provide a NACK 822, 824, 826, 828 by maintaining their SDA line drivers inactive during the time allocated for the dummy byte 808. In the illustrated example, a NACK 822, 824, 826, 828 is indicated when SDATA 802 is in a low signaling state.

The third type of response may be referred to as a Partial NACK response 830, which may be expected when at least one, but fewer than all devices associated with a GSID detect one or more errors in a multicast write transaction. Up to four receiving devices may be assigned a feedback slot in the dummy byte 808 and may drive SDATA 802 during respective assigned time slots when acknowledging a transmission. In the Partial NACK response 830, three receiving devices provide an ACK 832, 836, 838 by activating their SDA line drivers during an assigned feedback slot, drive SDATA 802 to the first signaling state associated with positive acknowledgement, drive SDATA 802 to the second signaling state before releasing SDATA 802 to provide a bus park. One receiving device provides a NACK 834 by maintaining its SDA line driver inactive during its assigned feedback slot. A receiving device may release SDATA 802 by causing its line driver to enter a high impedance state. In the illustrated example, each ACK 832, 836, 838 is indicated when SDATA 802 is driven to a high signaling state, and SDATA 802 is in a low signaling state after bus park and when the NACK 834 is being provided.

The transmitting device may respond to a Complete NACK response 820 by retransmitting the multicast transaction. The transmitting device may respond to a Partial NACK response 830 in a manner that may be determined or influenced by higher level protocol layers. In some implementations, the transmitting device may be configured to respond to a Partial NACK response 830 by retransmitting the multicast transaction. In some instances, the transmitting device may be configured to respond to a Partial NACK response 830 by retransmitting the payload of the multicast transaction in unicast transmissions directed to the individual receiving devices that provided a NACK 834.

Certain aspects of this disclosure provide a means by which a device that is compliant or compatible with more recently published SPMI protocols and/or SPMI specifications can be selectively configured to provide feedback in a dummy data byte. In one aspect, a bus master device may configure TDM feedback by configuring bit values in one or more registers in receiving devices that respond to a GSID. In one example, a first set of bit values may be configured to enable or disable TDM feedback in one or more devices responsive to the GSID, while a second set of bit values may be configured to define TDM feedback slot to be used by the enabled receiving devices. In some instances, TDM feedback is enabled using GSID configuration bits in a first register in each receiving device, and slot assignments are configured using USID configuration bits in a second register in each receiving device. In some implementations, the GSID configuration bits have the same value in each receiving device, and a broadcast message can be used to efficiently enable or disable TDM feedback.

Figure 9:
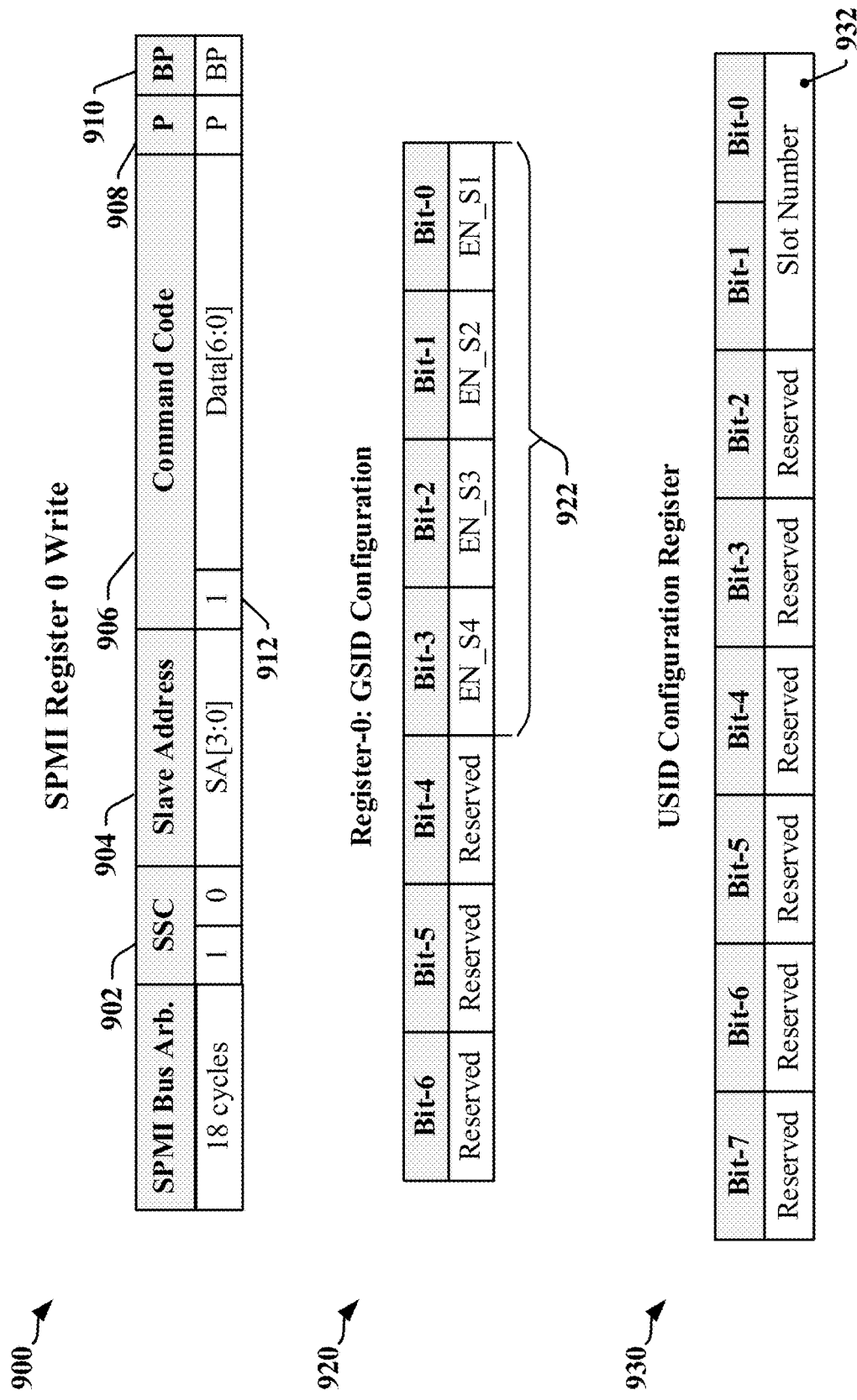
FIG. 9 illustrates a datagram structure for an SPMI Register-0 Write command in accordance with certain aspects disclosed herein.

FIG. 9 illustrates certain aspects related to TDM feedback implemented in accordance with certain aspects of this disclosure. In some implementations, Regiser-0 is used to maintain GSID configuration bits. Register-0 Write commands are transmitted in the shortest datagrams defined by SPMI protocols and can provide a fast and efficient technique for enabling and disabling TDM feedback. In other implementations GSID configuration bits may be maintained in a register other than Regiser-0.

A datagram 900 that includes a Register-0 Write command in accordance with SPMI protocols commences with transmission of a two-bit sequence start condition (SSC 902) followed by a four-bit slave address 904 or other device identifier. The 8-bit command code 906 is transmitted next. The 8-bit command code 906 is the only currently-defined command code that has a most significant bit (MSB 912) set to 1. The command code 906 is followed by a parity bit 908 and bus park signaling 910.

According to certain aspects disclosed herein, the Register-0 Write command in SPMI and RFFE protocols may be adapted to configure slave devices that can support the TDM feedback transmitted in a dummy data byte according to certain aspects disclosed herein. In one example, GSID configuration bits 922 provided in Register-0 920 may be usable to enable up to four slave devices for dummy data byte feedback. In the illustrated example, each of the four GSID configuration bits 922 in Register-0 920 defines status of dummy data byte feedback support for each receiving device. When one of the four GSID configuration bits 922 is set to a first logic state, then dummy data byte feedback is enabled, and when set to a second logic state, dummy data byte feedback is disabled.

According to certain aspects disclosed herein, USID configuration bits may be provided in an available register, or in a register with available bits, where the register mis referred to herein as the USID Configuration Register 930. In the example illustrated in FIG. 9, each receiving device that can provide TDM feedback may determine the feedback slot 642/742, 644/744, 646/746, 648/748 to be used for providing ACK/NACK. In the illustrated example a 2slot number 932 may be assigned for each receiving device by a bus master device.

Examples of Processing Circuits and Methods

Figure 10:
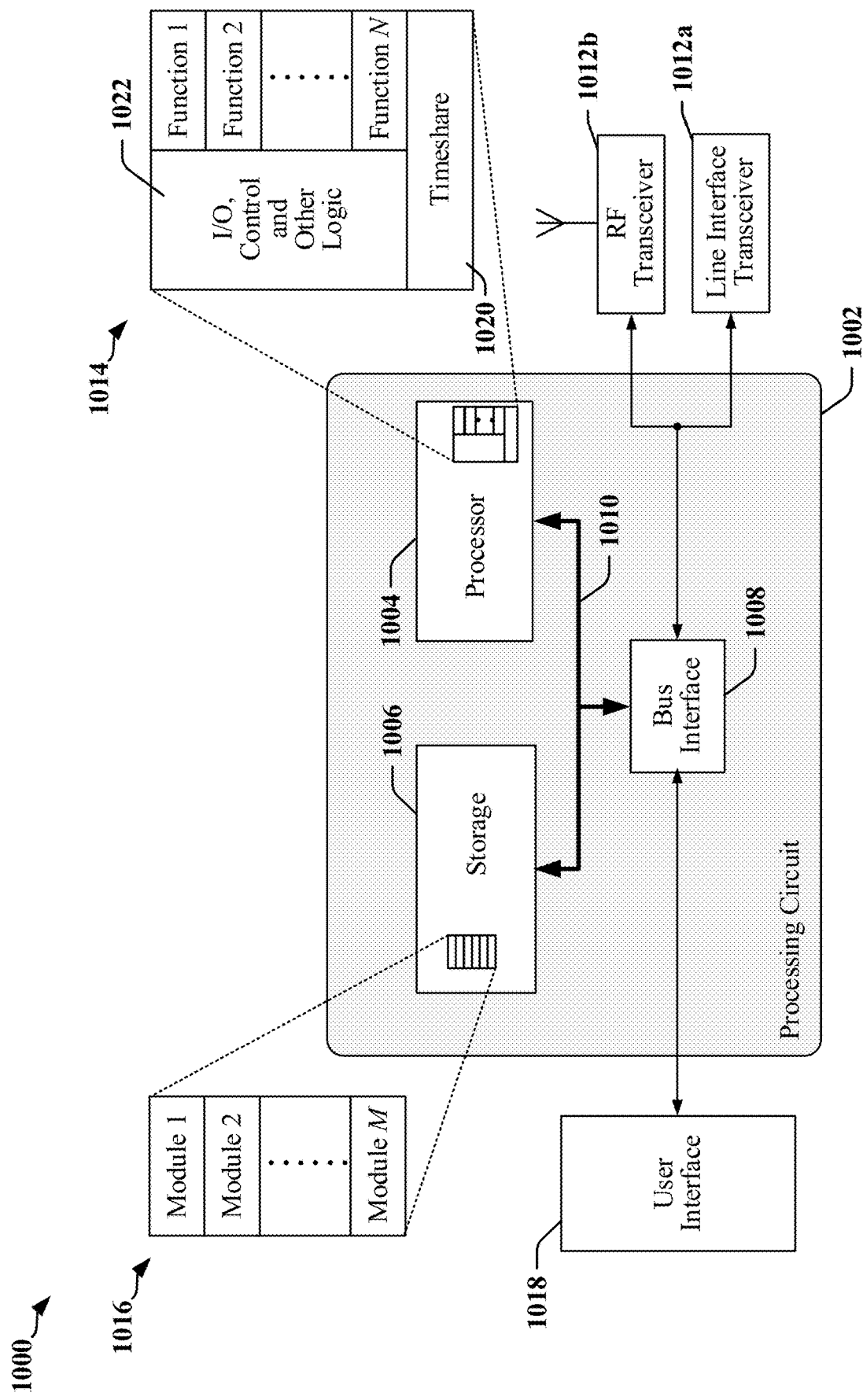
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012a, 1012b. A transceiver 1012a, 1012b may be provided for each networking technology supported by the processing circuit. In some instances, multiple networking technologies may share some or all of the circuitry or processing modules found in a transceiver 1012a, 1012b. Each transceiver 1012a, 1012b provides a means for communicating with various other apparatus over a transmission medium. In one example, a transceiver 1012a may be used to couple the apparatus 1000 to a multi-wire bus. In another example, a transceiver 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. The computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012a, 1012b, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012a, 1012b, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012a, 1012b, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
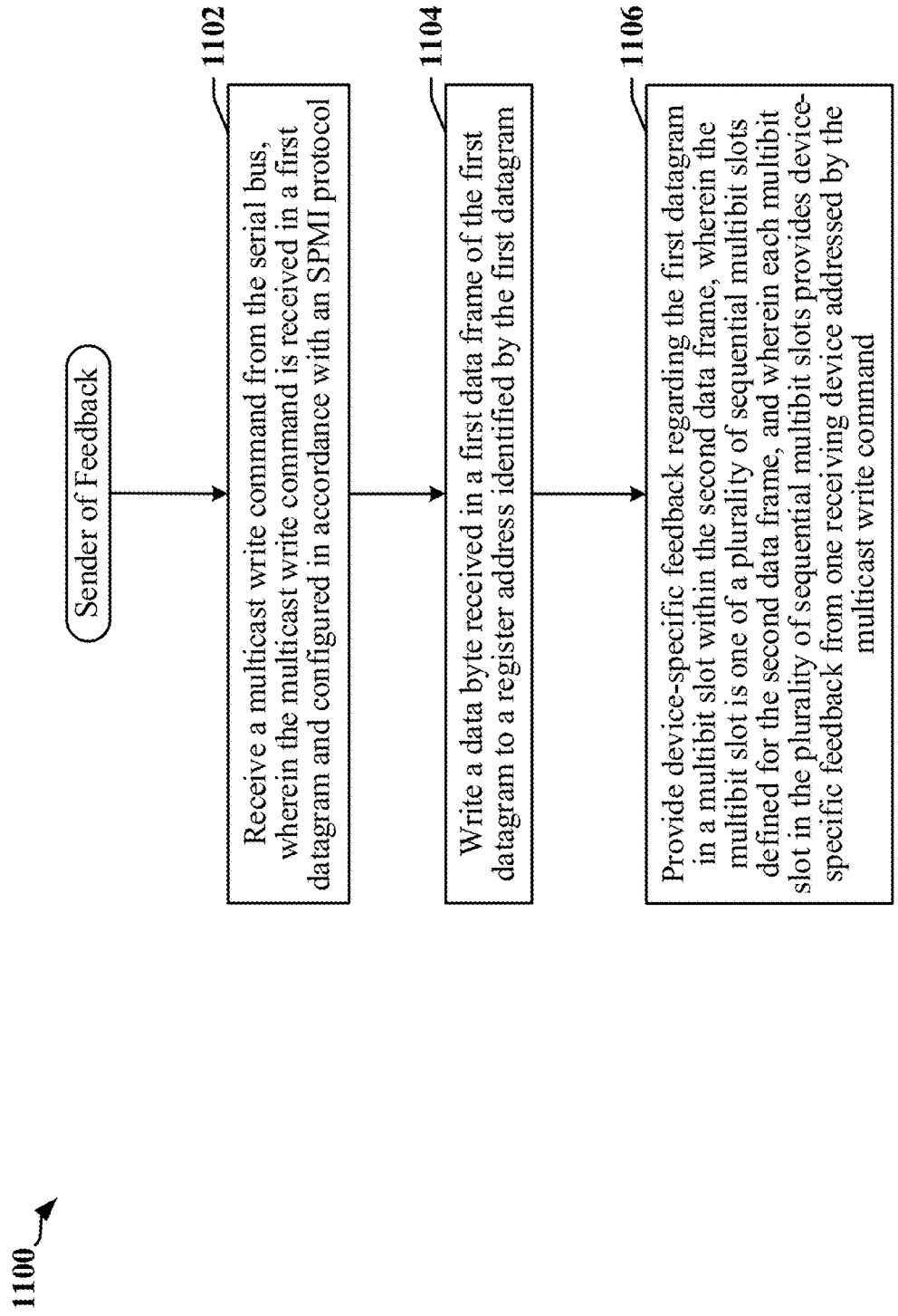
FIG. 11 is a first flowchart that illustrates certain aspects disclosed herein.

FIG. 11 is a flowchart 1100 of a method that may be performed by a device coupled to a serial bus. In one example, the serial bus may be operated in accordance with SPMI specifications. At block 1102, the device may receive a multicast write command from the serial bus. The multicast write command may be received in a first datagram. The multicast write command may be configured in accordance with an SPMI protocol. At block 1104, the device may write a data byte received in a first data frame of the first datagram to a register address identified by the first datagram. At block 1106, the device may provide device-specific feedback regarding the first datagram in a multibit slot within the second data frame. The multibit slot may be one of a plurality of sequential multibit slots defined for the second data frame. Each multibit slot in the plurality of sequential multibit slots may provide device-specific feedback from one receiving device addressed by the multicast write command. In one example, device-specific feedback in each multibit slot in the plurality of sequential multibit time slots may be provided by one receiving device configured to respond to a GSID transmitted in the multicast write command.

In some implementations, providing device-specific feedback includes driving a data line of the serial bus during the multibit slot to provide a device-specific acknowledgement of the first datagram, and refraining from driving the data line of the serial bus during the multibit slot when a transmission error is detected in the first datagram, thereby indicating a device-specific negative acknowledgement of the first datagram.

In some implementations, the device may actively drive the data line to a high signaling state during a first portion of the multibit slot when providing a device-specific acknowledgement of the first datagram. The device may provide a bus park sequence on the serial bus during a second portion of the multibit slot when providing the device-specific acknowledgement of the first datagram.

In certain examples, the device may receive a second datagram from the serial bus, and may determine timing of the multibit slot within the second data frame based on one or more bits provided in the second datagram. The one or more bits may represent a slot number.

In some examples, the device may receive configuration information in a broadcast command from the serial bus, and may provide device-specific feedback when the configuration information indicates that the second data frame is being provided for device-specific feedback. The broadcast command may be a write command directed to a register at a zero address. The configuration information may define which of a plurality of receiving devices is to provide device-specific feedback in the second data frame.

Figure 12:
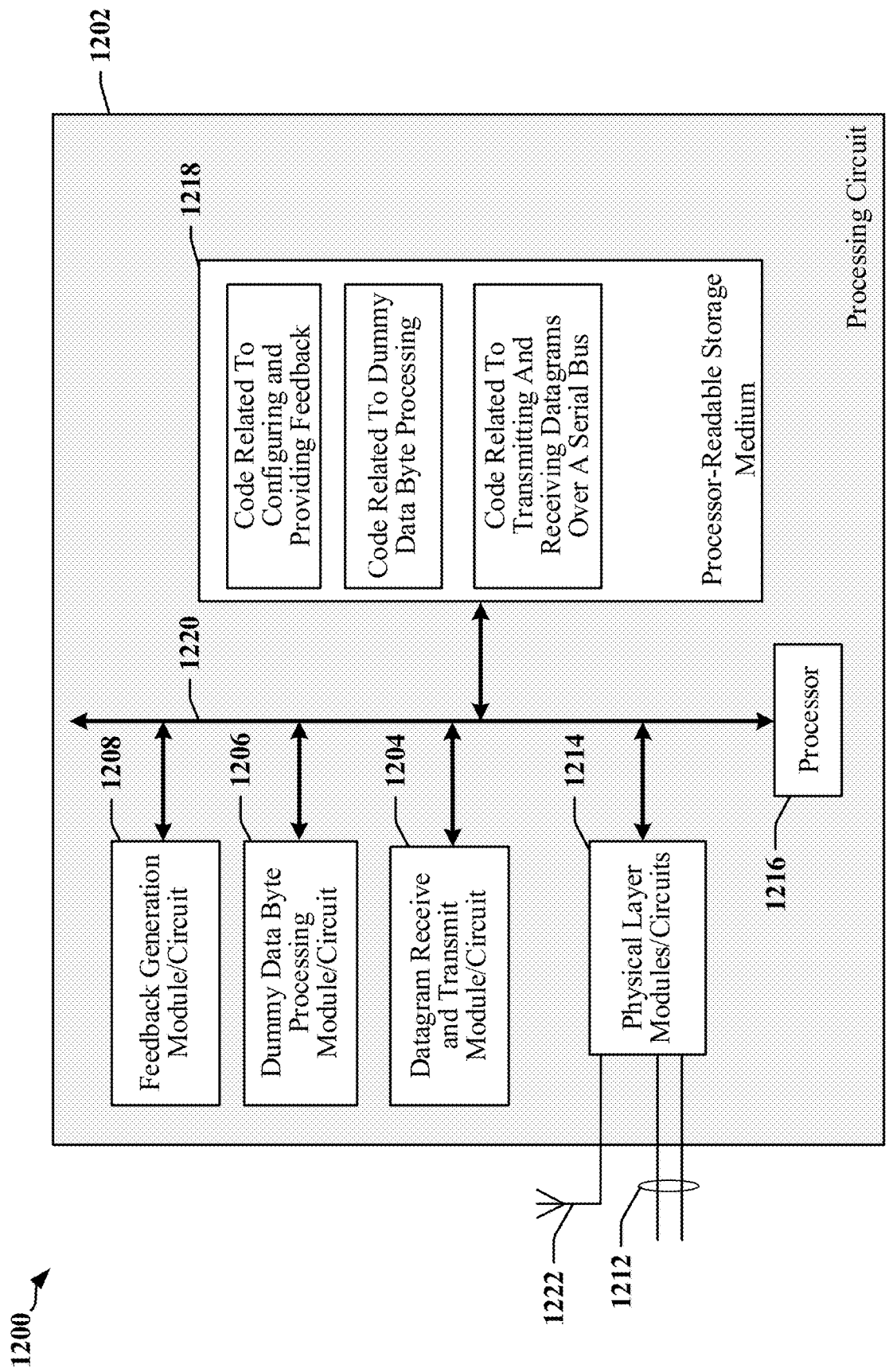
FIG. 12 illustrates a first example of a hardware implementation for an apparatus adapted in accordance with certain aspects disclosed herein.

FIG. 12 is a diagram illustrating a simplified example of a hardware implementation for an apparatus 1200 employing a processing circuit 1202. The processing circuit typically has a controller or processor 1216 that may include one or more microprocessors, microcontrollers, digital signal processors, sequencers and/or state machines. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the controller or processor 1216, the modules or circuits 1204, 1206 and 1208 and the processor-readable storage medium 1218. One or more physical layer circuits and/or modules 1214 may be provided to support communication over a communication link implemented using a multi-wire bus 1212, through an antenna or antenna array 1222 (to a radio access network for example), and so on. The bus 1220 may also link various other circuits such as timing sources, peripherals, voltage regulators, and power management circuits, which are well known in the art, and therefore, will not be described any further.

The processor 1216 is responsible for general processing, including the execution of software, code and/or instructions stored on the processor-readable storage medium 1218. The processor-readable storage medium 1218 may include a non-transitory storage medium. The software, when executed by the processor 1216, causes the processing circuit 1202 to perform the various functions described supra for any particular apparatus. The processor-readable storage medium 1218 may be used for storing data that is manipulated by the processor 1216 when executing software. The processing circuit 1202 further includes at least one of the modules 1204, 1206 and 1208. The modules 1204, 1206 and 1208 may be software modules running in the processor 1216, resident/stored in the processor-readable storage medium 1218, one or more hardware modules coupled to the processor 1216, or some combination thereof. The modules 1204, 1206 and 1208 may include microcontroller instructions, state machine configuration parameters, or some combination thereof.

In one configuration, the apparatus 1200 includes modules and/or circuits 1208 adapted to detect or determine errors in received data, including a parity bit condition that may indicate that a transmission error occurred. The apparatus 1200 may include modules and/or circuits 1206 adapted to process dummy data bytes, and modules and/or circuits 1204 adapted to configure, conduct and/or participate in transactions over the multi-wire bus 1212 configured to operate according to SPMI specifications or protocols. The dummy data bytes may have been transmitted for feedback purposes.

In certain implementations, the apparatus 1200 includes physical layer circuits and/or modules 1214 that implement an interface circuit adapted to couple the apparatus 1200 to the multi-wire bus 1212. The apparatus 1200 may have a processor 1216 configured to receive a multicast write command from the serial bus. The multicast write command may be received in a first datagram and configured in accordance with an SPMI protocol. The processor 1216 may be configured to write a data byte received in a first data frame of the first datagram to a register address identified by the first datagram, and provide device-specific feedback regarding the first datagram in a multibit slot within the second data frame. The multibit slot may be one of a plurality of sequential multibit slots defined for the second data frame. Each multibit slot in the plurality of sequential multibit time slots may provide device-specific feedback from one receiving device addressed by the multicast write command. Device-specific feedback in each multibit slot in the plurality of sequential multibit time slots is provided by one receiving device configured to respond to a GSID transmitted in the multicast write command.

In some implementations the processor 1216 may be configured to drive a data line of the serial bus during the multibit slot to provide a device-specific acknowledgement of the first datagram, and refrain from driving the data line of the serial bus during the multibit slot when a transmission error is detected in the first datagram, thereby indicating a device-specific negative acknowledgement of the first datagram.

In some examples, the processor 1216 may be further configured to actively drive the data line to a high signaling state during a first portion of the multibit slot when providing a device-specific acknowledgement of the first datagram, and provide a bus park sequence on the serial bus during a second portion of the multibit slot when providing the device-specific acknowledgement of the first datagram.

In certain examples, the processor 1216 may be further configured to receive a second datagram from the serial bus, and determine timing of the multibit slot within the second data frame based on one or more bits provided in the second datagram. The one or more bits may represent a slot number.

In some implementations, the processor is further configured to receive configuration information in a broadcast command from the serial bus, and provide device-specific feedback when the configuration information indicates that the second data frame is being provided for device-specific feedback. The broadcast command may be a write command directed to a register at a zero address. The configuration information may define which of a plurality of receiving devices is to provide device-specific feedback in the second data frame.

The processor-readable storage medium 1218 may include transitory or non-transitory storage devices configured to store code, instructions and/or parameters used to implement one or more methods or procedures disclosed herein. The processor-readable storage medium 1218 may include code for receiving a multicast write command from the serial bus. The multicast write command may be received in a first datagram. The multicast write command may be configured in accordance with an SPMI protocol. The processor-readable storage medium 1218 may include code for writing a data byte received in a first data frame of the first datagram to a register address identified by the first datagram, and providing device-specific feedback regarding the first datagram in a multibit slot within the second data frame. The multibit slot may be one of a plurality of sequential multibit slots defined for the second data frame. Each multibit slot in the plurality of sequential multibit slots may provide device-specific feedback from one receiving device addressed by the multicast write command. In one example, device-specific feedback in each multibit slot in the plurality of sequential multibit time slots may be provided by one receiving device configured to respond to a GSID transmitted in the multicast write command.

In some implementations, the processor-readable storage medium 1218 may include code for driving a data line of the serial bus during the multibit slot to provide a device-specific acknowledgement of the first datagram, and code for refraining from driving the data line of the serial bus during the multibit slot when a transmission error is detected in the first datagram, thereby indicating a device-specific negative acknowledgement of the first datagram.

In some implementations, the processor-readable storage medium 1218 may include code that causes the processor 1216 to actively drive the data line to a high signaling state during a first portion of the multibit slot when providing a device-specific acknowledgement of the first datagram. The processor-readable storage medium 1218 may include code that causes the processor 1216 to provide a bus park sequence on the serial bus during a second portion of the multibit slot when providing the device-specific acknowledgement of the first datagram.

In certain examples, the processor-readable storage medium 1218 may include code for receiving a second datagram from the serial bus, and may determine timing of the multibit slot within the second data frame based on one or more bits provided in the second datagram. The one or more bits may represent a slot number.

In some examples, the processor-readable storage medium 1218 may include code for receiving configuration information in a broadcast command from the serial bus, and providing device-specific feedback when the configuration information indicates that the second data frame is being provided for device-specific feedback. The broadcast command may be a write command directed to a register at a zero address. The configuration information may define which of a plurality of receiving devices is to provide device-specific feedback in the second data frame.

Figure 13:
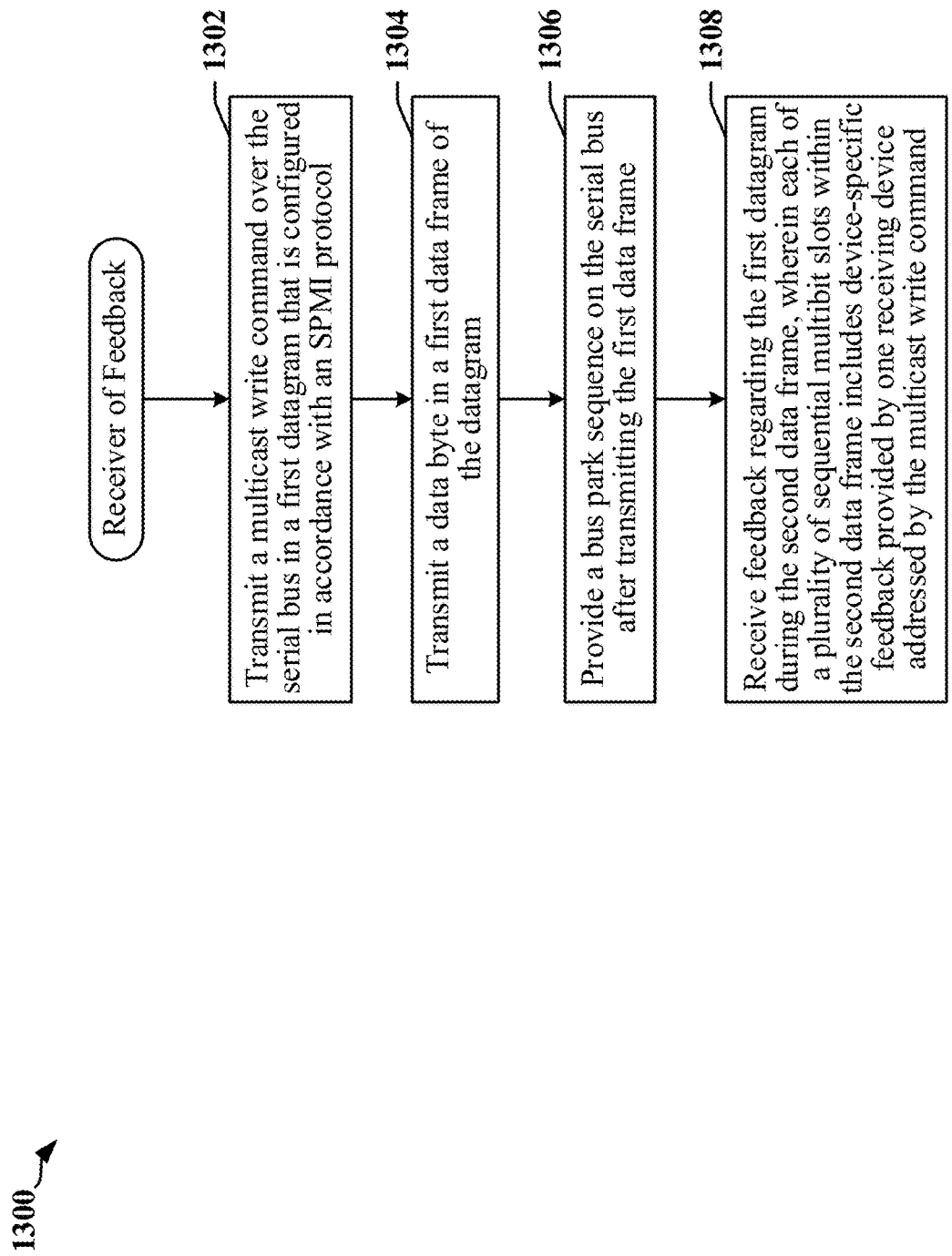
FIG. 13 is a second flowchart that illustrates certain aspects disclosed herein.

FIG. 13 is a flowchart 1300 of a method that may be performed by a device coupled to a serial bus. In one example, the serial bus may be operated in accordance with SPMI specifications. At block 1302, the device may transmit a multicast write command over the serial bus in a first datagram that is configured in accordance with an SPMI protocol. At block 1304, the device may transmit a data byte in a first data frame of the datagram. At block 1306, the device may provide a bus park sequence on the serial bus after transmitting the first data frame. At block 1308, the device may receive feedback regarding the first datagram during the second data frame. Each of a plurality of sequential multibit slots within the second data frame may include device-specific feedback provided by one receiving device addressed by the multicast write command.

In one example, the device-specific feedback in each multibit slot in the plurality of sequential multibit time slots is provided by a device configured to respond to a GSID transmitted in the multicast write command.

In certain examples, the device may transmit a second datagram over the serial bus to a first receiving device. The second datagram may include one or more bits defining timing of a multibit slot within the second data frame to be used by the first receiving device when providing device-specific feedback. The one or more bits may represent a slot number.

In some examples, the device may transmit a broadcast command over the serial bus. The broadcast command may define which of a plurality of receiving devices is to provide device-specific feedback in the second data frame. The broadcast command may be a write command directed to a register at a zero address.

Figure 14:
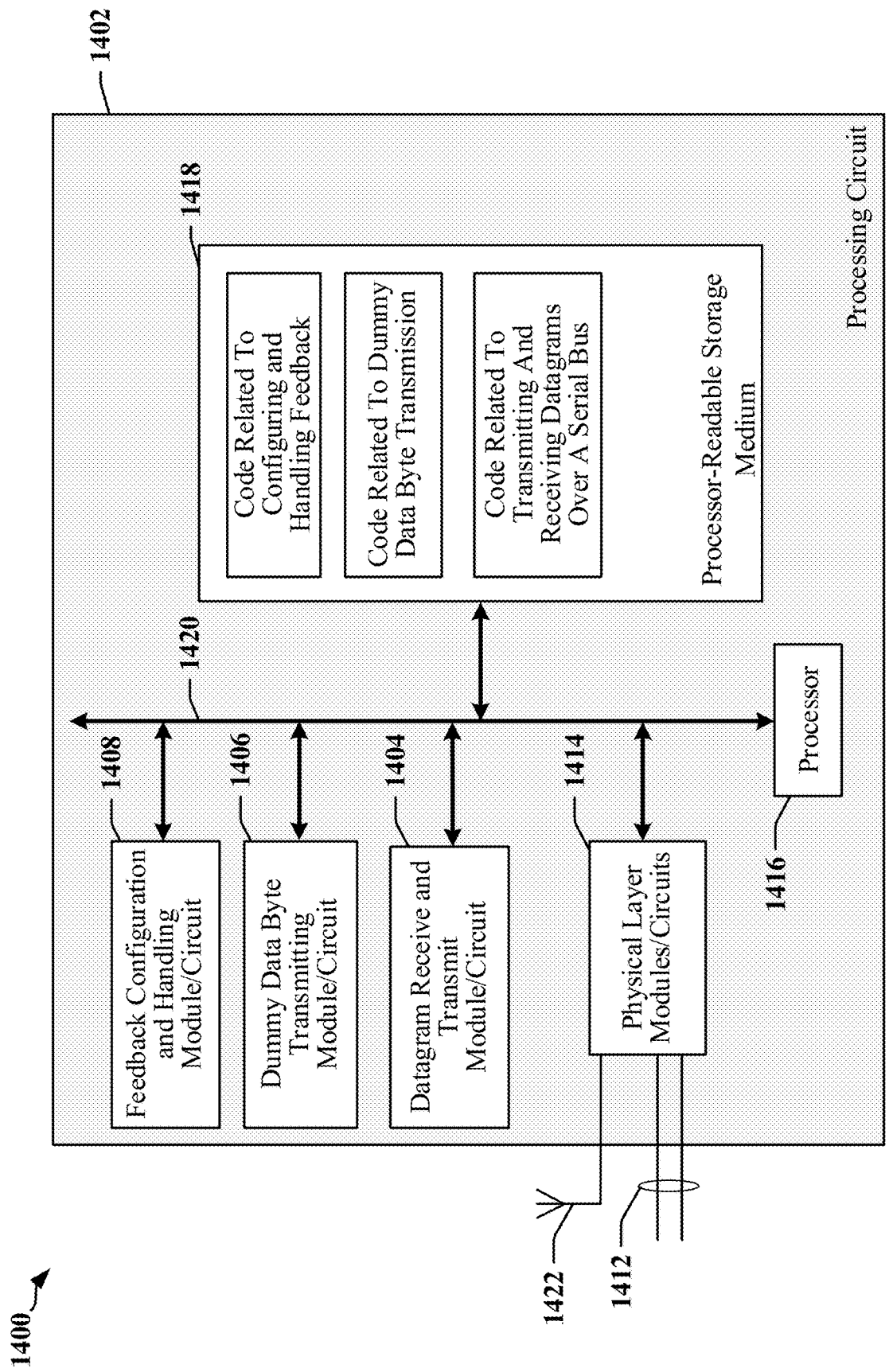
FIG. 14 illustrates a second example of a hardware implementation for an apparatus adapted in accordance with certain aspects disclosed herein.

FIG. 14 is a diagram illustrating a simplified example of a hardware implementation for an apparatus 1400 employing a processing circuit 1402. The processing circuit typically has a controller or processor 1416 that may include one or more microprocessors, microcontrollers, digital signal processors, sequencers and/or state machines. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the controller or processor 1416, the modules or circuits 1404, 1406 and 1408 and the processor-readable storage medium 1418. One or more physical layer circuits and/or modules 1414 may be provided to support communication over a communication link implemented using a multi-wire bus 1412, through an antenna or antenna array 1422 (to a radio access network for example), and so on. The bus 1420 may also link various other circuits such as timing sources, peripherals, voltage regulators, and power management circuits, which are well known in the art, and therefore, will not be described any further.

The processor 1416 is responsible for general processing, including the execution of software, code and/or instructions stored on the processor-readable storage medium 1418. The processor-readable storage medium 1418 may include a non-transitory storage medium. The software, when executed by the processor 1416, causes the processing circuit 1402 to perform the various functions described supra for any particular apparatus. The processor-readable storage medium 1418 may be used for storing data that is manipulated by the processor 1416 when executing software. The processing circuit 1402 further includes at least one of the modules 1404, 1406 and 1408. The modules 1404, 1406 and 1408 may be software modules running in the processor 1416, resident/stored in the processor-readable storage medium 1418, one or more hardware modules coupled to the processor 1416, or some combination thereof. The modules 1404, 1406 and 1408 may include microcontroller instructions, state machine configuration parameters, or some combination thereof.

In one configuration, the apparatus 1400 includes modules and/or circuits 1408 adapted to configure devices coupled to the serial bus to report feedback on errors in received data, including a parity bit condition that may indicate that a transmission error occurred. The apparatus 1400 may include modules and/or circuits 1406 adapted to transmit dummy data bytes, and modules and/or circuits 1404 adapted to configure, conduct and/or participate in transactions over the multi-wire bus 1412 configured to operate according to SPMI specifications or protocols. The dummy data bytes may be transmitted for feedback purposes.

In certain implementations, the apparatus 1400 includes physical layer circuits and/or modules 1414 that implement an interface circuit adapted to couple the apparatus 1400 to the multi-wire bus 1412. The apparatus 1400 may have a processor 1416 configured to transmit a multicast write command over the serial bus in a first datagram that is configured in accordance with an SPMI protocol, transmit a data byte in a first data frame of the datagram, provide a bus park sequence on the serial bus after transmitting the first data frame, and receive feedback regarding the first datagram during the second data frame. Each of a plurality of sequential multibit slots within the second data frame may include device-specific feedback provided by one receiving device addressed by the multicast write command.

In one example, the device-specific feedback in each multibit slot in the plurality of sequential multibit time slots is provided by a device configured to respond to a GSID transmitted in the multicast write command.

In one example, the processor may be further configured to transmit a second datagram over the serial bus to a first receiving device. The second datagram may include one or more bits defining timing of a multibit slot within the second data frame to be used by the first receiving device when providing device-specific feedback. The one or more bits may represent a slot number.

In certain examples, the processor is further configured to transmit a broadcast command over the serial bus. The broadcast command may define which of a plurality of receiving devices is to provide device-specific feedback in the second data frame. The broadcast command may be a write command directed to a register at a zero address.

The processor-readable storage medium 1418 may include transitory or non-transitory storage devices configured to store code, instructions and/or parameters used to implement one or more methods or procedures disclosed herein. The processor-readable storage medium 1418 may include code for transmitting a multicast write command over the serial bus in a first datagram that is configured in accordance with an SPMI protocol, transmitting a data byte in a first data frame of the datagram, providing a bus park sequence on the serial bus after transmitting the first data frame, and receiving feedback regarding the first datagram during the second data frame. Each of a plurality of sequential multibit slots within the second data frame includes device-specific feedback provided by one receiving device addressed by the multicast write command.

In some instances, the device-specific feedback in each multibit slot in the plurality of sequential multibit time slots is provided by a device configured to respond to an GSID transmitted in the multicast write command.

In certain implementations, the processor-readable storage medium 1418 may include code for transmitting a second datagram over the serial bus to a first receiving device. The second datagram may include one or more bits defining timing of a multibit slot within the second data frame to be used by the first receiving device when providing device-specific feedback. The one or more bits may represent a slot number.

In some examples, the processor-readable storage medium 1418 may include code for transmitting a broadcast command over the serial bus. The broadcast command may define which of a plurality of receiving devices is to provide device-specific feedback in the second data frame. The broadcast command may be a write command directed to a register at a zero address.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication at a device coupled to a serial bus, comprising:
    receiving a multicast write command from the serial bus, wherein the multicast write command is received in a first datagram and configured in accordance with a System Power Management Interface (SPMI) protocol;
    writing a data byte received in a first data frame of the first datagram to a register address identified by the first datagram; and
    providing device-specific feedback regarding the first datagram in a multibit slot within a second data frame, wherein the multibit slot is one of a plurality of sequential multibit slots defined for the second data frame, and wherein each multibit slot in the plurality of sequential multibit slots provides device-specific feedback from one receiving device addressed by the multicast write command.

2. The method of claim 1, wherein the device-specific feedback in each multibit slot in the plurality of sequential multibit slots is provided by one receiving device configured to respond to a group slave identifier (GSID) transmitted in the multicast write command.

3. The method of claim 1, wherein providing the device-specific feedback comprises:
    driving a data line of the serial bus during the multibit slot to provide a device-specific acknowledgement of the first datagram; and
    refraining from driving the data line of the serial bus during the multibit slot when a transmission error is detected in the first datagram, thereby indicating a device-specific negative acknowledgement of the first datagram.

4. The method of claim 1, further comprising:
    actively driving a data line of the serial bus to a high signaling state during a first portion of the multibit slot when providing a device-specific acknowledgement of the first datagram; and
    providing a bus park sequence on the serial bus during a second portion of the multibit slot when providing the device-specific acknowledgement of the first datagram.

5. The method of claim 1, further comprising:
    receiving a second datagram from the serial bus; and
    determining timing of the multibit slot within the second data frame based on one or more bits provided in the second datagram.

6. The method of claim 5, wherein the one or more bits represent a slot number.

7. The method of claim 1, further comprising:
    receiving configuration information in a broadcast command from the serial bus; and
    providing the device-specific feedback when the configuration information indicates that the second data frame is being provided for the device-specific feedback.

8. The method of claim 7, wherein the broadcast command is a write command directed to a register at a zero address.

9. The method of claim 7, wherein the configuration information defines which of a plurality of receiving devices is to provide the device-specific feedback in the second data frame.

10. An apparatus for data communication comprising:
    an interface circuit adapted to couple the apparatus to a serial bus; and
    a processor configured to:
        receive a multicast write command from the serial bus, wherein the multicast write command is received in a first datagram and configured in accordance with a System Power Management Interface (SPMI) protocol;
        write a data byte received in a first data frame of the first datagram to a register address identified by the first datagram; and
        provide device-specific feedback regarding the first datagram in a multibit slot within a second data frame,
    wherein the multibit slot is one of a plurality of sequential multibit slots defined for the second data frame, and wherein each multibit slot in the plurality of sequential multibit slots provides device-specific feedback from one receiving device addressed by the multicast write command.

11. The apparatus of claim 10, wherein the device-specific feedback in each multibit slot in the plurality of sequential multibit slots is provided by one receiving device configured to respond to a group slave identifier (GSID) transmitted in the multicast write command.

12. The apparatus of claim 10, wherein the processor is further configured to:
   drive a data line of the serial bus during the multibit slot to provide a device-specific acknowledgement of the first datagram; and
   refrain from driving the data line of the serial bus during the multibit slot when a transmission error is detected in the first datagram, thereby indicating a device-specific negative acknowledgement of the first datagram.

13. The apparatus of claim 10, wherein the processor is further configured to:
   actively drive a data line of the serial bus to a high signaling state during a first portion of the multibit slot when providing a device-specific acknowledgement of the first datagram; and
   provide a bus park sequence on the serial bus during a second portion of the multibit slot when providing the device-specific acknowledgement of the first datagram.

14. The apparatus of claim 10, wherein the processor is further configured to:
   receive a second datagram from the serial bus; and
   determine timing of the multibit slot within the second data frame based on one or more bits provided in the second datagram.

15. The apparatus of claim 14, wherein the one or more bits represent a slot number.

16. The apparatus of claim 10, wherein the processor is further configured to:
   receive configuration information in a broadcast command from the serial bus; and
   provide the device-specific feedback when the configuration information indicates that the second data frame is being provided for the device-specific feedback.

17. The apparatus of claim 16, wherein the broadcast command is a write command directed to a register at a zero address.

18. The apparatus of claim 16, wherein the configuration information defines which of a plurality of receiving devices is to provide the device-specific feedback in the second data frame.

19. A method of data communication at a device coupled to a serial bus, comprising:
   transmitting a multicast write command over the serial bus in a first datagram that is configured in accordance with a System Power Management Interface (SPMI) protocol;
   transmitting a data byte in a first data frame of the first datagram;
   providing a bus park sequence on the serial bus after transmitting the first data frame; and
   receiving feedback regarding the first datagram in a second data frame, wherein each of a plurality of sequential multibit slots within the second data frame includes device-specific feedback provided by one receiving device addressed by the multicast write command.

20. The method of claim 19, wherein the device-specific feedback in each multibit slot in the plurality of sequential multibit slots is provided by one receiving device configured to respond to a group slave identifier (GSID) transmitted in the multicast write command.

21. The method of claim 19, further comprising:
   transmitting a second datagram over the serial bus to a first receiving device, the second datagram including one or more bits defining timing of a multibit slot within the second data frame to be used by the first receiving device when providing the device-specific feedback.

22. The method of claim 21, wherein the one or more bits represent a slot number.

23. The method of claim 19, further comprising:
   transmitting a broadcast command over the serial bus, the broadcast command defining which of a plurality of receiving devices is to provide the device-specific feedback in the second data frame.

24. The method of claim 23, wherein the broadcast command is a write command directed to a register at a zero address.

25. An apparatus for data communication comprising:
   an interface circuit adapted to couple the apparatus to a serial bus; and
   a processor configured to:
      transmit a multicast write command over the serial bus in a first datagram that is configured in accordance with a System Power Management Interface (SPMI) protocol;
      transmit a data byte in a first data frame of the first datagram;
      provide a bus park sequence on the serial bus after transmitting the first data frame; and
      receive feedback regarding the first datagram in a second data frame,
   wherein each of a plurality of sequential multibit slots within the second data frame includes device-specific feedback provided by one receiving device addressed by the multicast write command.

26. The apparatus of claim 25, wherein the device-specific feedback in each multibit slot in the plurality of sequential multibit slots is provided by one receiving device configured to respond to a group slave identifier (GSID) transmitted in the multicast write command.

27. The apparatus of claim 25, wherein the processor is further configured to:
   transmit a second datagram over the serial bus to a first receiving device, the second datagram including one or more bits defining timing of a multibit slot within the second data frame to be used by the first receiving device when providing the device-specific feedback.

28. The apparatus of claim 27, wherein the one or more bits represent a slot number.

29. The apparatus of claim 25, wherein the processor is further configured to:
   transmit a broadcast command over the serial bus, the broadcast command defining which of a plurality of receiving devices is to provide the device-specific feedback in the second data frame.

30. The apparatus of claim 29, wherein the broadcast command is a write command directed to a register at a zero address.

* * * * *